Mar. 3, 1925.
G. F. MILES
1,528,123
WIND AND RAIN SHIELD
Filed Jan. 26, 1923
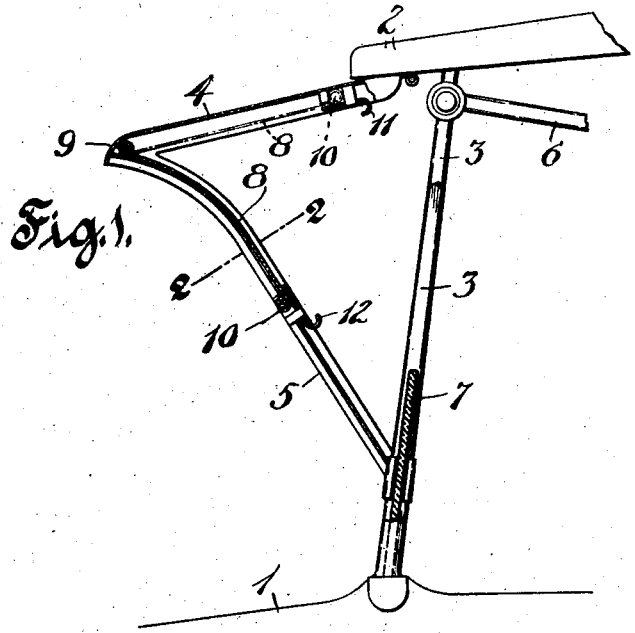
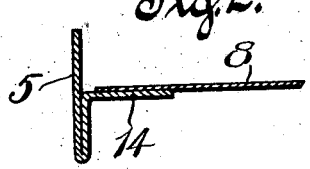
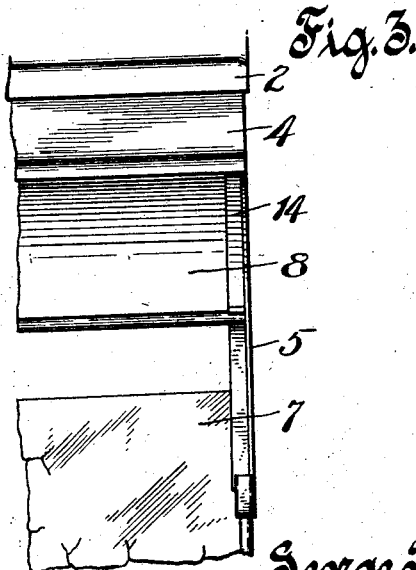
INVENTOR
George F. Miles
BY
Milebeed Brothers
ATTORNEYS.

Patented Mar. 3, 1925.

1,528,123

UNITED STATES PATENT OFFICE.

GEORGE F. MILES, OF NEW YORK, N. Y.

WIND AND RAIN SHIELD.

Application filed January 26, 1923. Serial No. 614,987.

*To all whom it may concern:*

Be it known that I, GEORGE F. MILES, a citizen of the United States of America, residing at New York, N. Y., have invented new and useful Improvements in Wind and Rain Shields, of which the following is a specification.

My invention relates to improvements in wind and rain shields for use with rapidly moving vehicles, the purpose being to provide means for affording an open or free line of vision for the operator, through which rain or snow will not drive. In certain respects it is an improvement on the structure set forth in my former Patent No. 1,416,112, dated May 16, 1922, as will be seen by reference to the following specification and examination of the accompanying drawings, in which—

Fig. 1 is a side elevation partly in section.

Fig. 2 is a section on the line 2—2 of Fig. 1.

Fig. 3 is a front view of one end of the shield as it would appear in use.

1 represents a portion of the usual cowl or dash-board part of a vehicle. 2 represents a portion of the usual top or roof. 3 represents one of the side supports or standards, two of which are provided, one on each side of the vehicle. Each standard 3 may be independent of the top, as in a touring car, or may be permanently connected thereto as in a closed car such as a sedan or a limousine. 4 represents a shade member which projects forwardly from the top or the upper ends of the standards. 5 represents a side support or brace, one of which is provided at each end of the sun-shade 4 to hold it in the proper position, each brace being suitably connected with the forward part of the body in front of the standards. 6 represents a part of a pivoted upper wind shield section such as usually provided between the standards. 7 represents a lower wind shield section also usually provided, between the standards 3—3. 8 represents a combined shield and deflector which, in the form shown, comprises a flexible sheet of suitable material, preferably transparent. The forward edge of this sheet is secured at 9 to the forward under side of the shade 4, while the rear edge is movable and is preferably provided with a reenforcement or stiffener 10. The rear edge of this combined shield and deflector 8 may be moved up to an out of the way position shown in dotted lines in Fig. 1, wherein it lies closely under the shade 4, being held in place by any suitable means such as a latch conventionally shown at 11, which may engage the ends of the stiffener rod 10; or, the rear edge of said deflector 8 may be moved down into the operative position shown in solid lines in Fig. 1, wherein it may be suitably held by any appropriate mechanism such as a latch conventionally shown at 12. In order to generate a proper draft of air in a downward direction, whereby rain or snow will be driven downwardly across the clear vision passage instead of being permitted to drive through said passage, the forward part of the deflector should be curved, and to that end, it is desirable to provide suitable means for holding or supporting the deflector, when in its operative position, in the properly curved form. One convenient means for this purpose may comprise a supporting flange 14 (see Fig. 2), formed along the inner edge of each side brace 5. Each of these flanges may be properly curved to hold the flexible deflector on said curve. The lower part of the deflector 8 should preferably be held in a substantially flat plane, as appears from reference to Fig. 2, and to that end the lower part of each flange 14 may be straight; thus, as shown in Fig. 1, the upper part of the flexible deflector will be curved to catch the air and start the draft so that the velocity of the air will be built up and increased to the maximum as it rushes down the lower flat face of the deflector. By this arrangement, the highest efficiency will be attained. While I have shown the deflector 8 as provided with one reenforcement or stiffener 11, extending across the same, other stiffeners may be added if desired. The shade 4 is preferably made from sheet metal stamped out so as to be dished on its lower side. The side braces or supports 5 may also be made from sheet metal, and may be modified in design.

I claim:

1. In a clear vision device for windshields, a shade, a flexible deflector connected at its upper edge to the forward under side of said shade, with supporting means for said deflector to hold the same in a curved form when in operative position.

2. In a device of the character described, a windshield including a lower section, a removable upper section, a shade projecting forwardly of the latter, a flexible deflector comprising a single sheet arranged in front of said upper section and suspended from and below the forward part of said shield, with a curved means for holding said deflector in a downwardly and rearwardly inclined position with the lower rear edge of said deflector above and in front of the upper edge of said lower section to afford a clear vision passage between said parts.

3. In a clear vision device for windshields, a lower windshield section, a shade arranged above said lower section and projecting forwardly of the same, deflector means extending downwardly from the forward part of said shade, comprising a flexible sheet curved supporting means therefor, said sheet extending downwardly and rearwardly from the line of support and terminating in a plane above and in front of the upper edge of said lower section to afford an opening space for unobstructed vision.

4. In a clear vision device for windshields, a lower windshield section, a shade arranged above said lower section and projecting forwardly of the same, deflector means extending downwardly from the forward part of said shade, comprising a flexible sheet, said sheet extending downwardly and rearwardly from the line of support and terminating in a plane above and in front of the upper edge of said lower section to afford an opening space for unobstructed vision, with means for supporting said sheet on a curve throughout a portion of its length.

5. A combined shade and deflector for automobiles and the like, comprising a shade element, a flexible transparent sheet forming a deflector, the upper and forward edge of said sheet being secured to the forward part of the said shade with means for holding said sheet in a predetermined curve extending in a rearwardly and downwardly inclined position to deflect air for the purpose described.

GEORGE F. MILES.